UNITED STATES PATENT OFFICE.

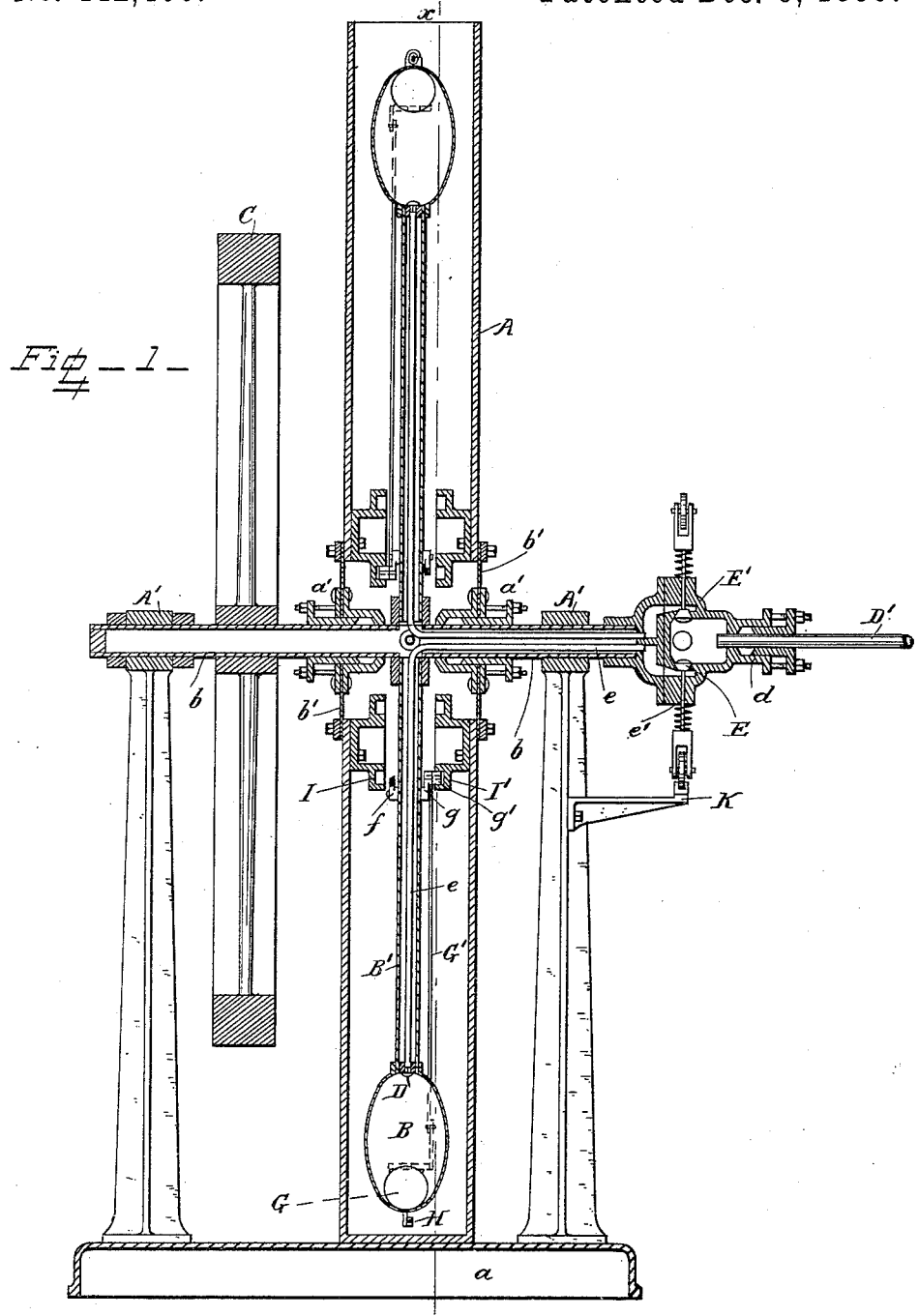

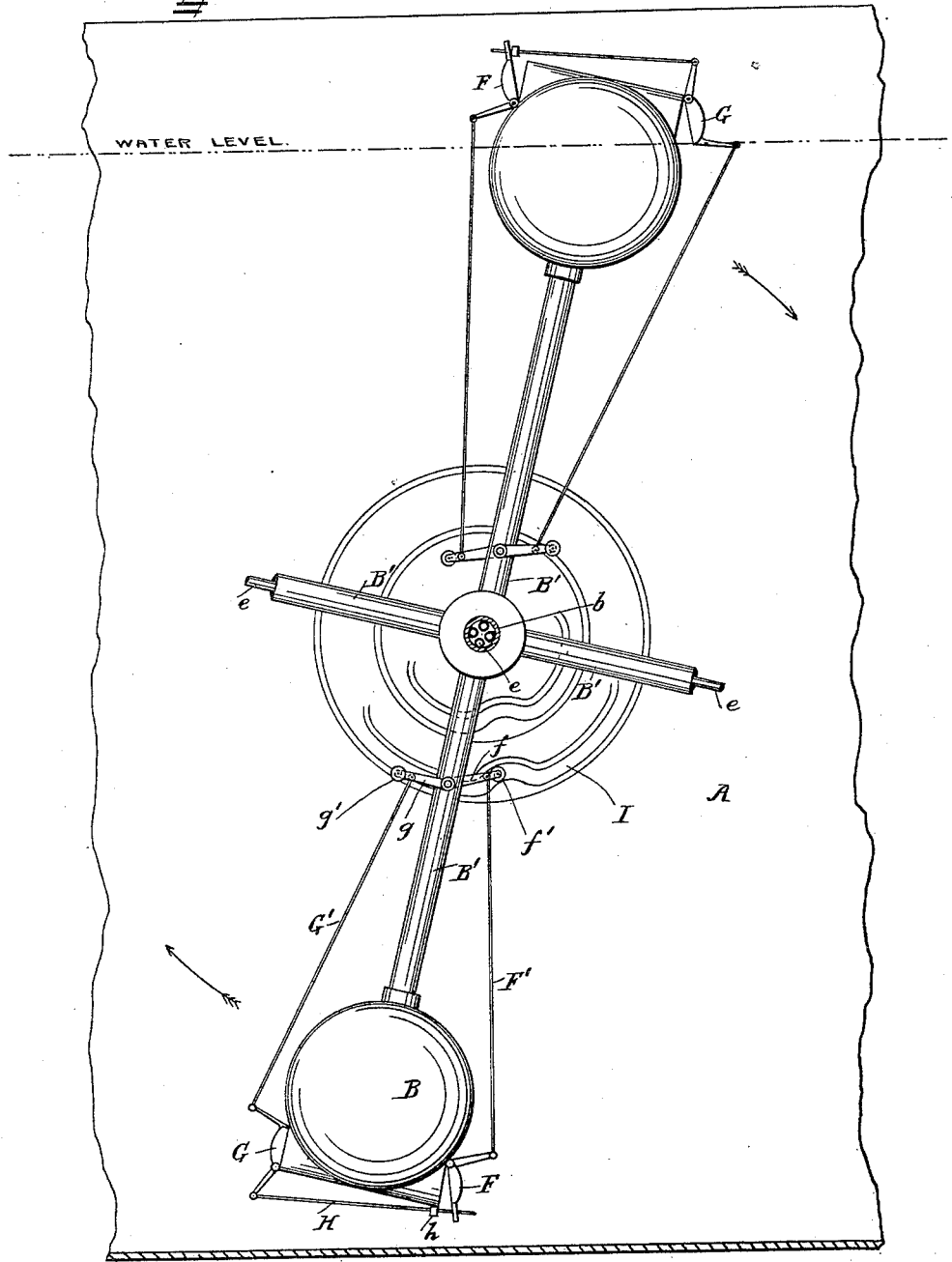

WILLIAM SCANTLEBURY, OF WASHINGTON, DISTRICT OF COLUMBIA.

AIR-MOTOR.

SPECIFICATION forming part of Letters Patent No. 442,400, dated December 9, 1890.

Application filed April 4, 1890. Serial No. 346,575. (No model.)

*To all whom it may concern:*

Be it known that I, WILLIAM SCANTLEBURY, a citizen of the United States, residing at Washington, in the District of Columbia, have invented certain new and useful Improvements in Air-Motors; and I do hereby declare the following to be a full, clear, and exact description of the invention, such as will enable others skilled in the art to which it appertains to make and use the same.

This invention relates to air-motors; and it consists in the novel construction and combination of the parts hereinafter fully described and claimed.

In the drawings, Figure 1 is a central longitudinal section through the motor, and Fig. 2 is a cross-section taken on line $x\ x$ in Fig. 1.

A is a tank, containing water or other similar liquid, supported upon the base-plate $a$.

B is a hollow vessel, shown submerged beneath the water and at the lower part of the tank. B' is a hollow arm secured to said vessel at its free end and having its other end secured to the hollow shaft $b$. The shaft $b$ passes through stuffing-boxes $a'$, supported by the sides of the tank, and is pivoted in the bearing-brackets A', which are secured to the base-plate. The stuffing-boxes are of any ordinary approved construction, and in order that they may not act as bearings for the shaft and require to be truly aligned with the shaft-bearings the said stuffing-boxes are connected to the tank sides by supporting-plates $b'$, of india-rubber or other similar flexible and water-tight material, which plates permit the stuffing-boxes to adapt themselves to every movement or vibration of the shaft which passes through them.

Valves are provided for admitting compressed air through the hollow shaft and arm to the vessel B when it is at the bottom of the tank and for letting out the air and admitting water to said vessel when at the top of the tank. These valves will be more fully described hereinafter.

Any convenient air-compressor may be used to compress the air, and the pressure of the air may be more or less, as found convenient in working. In a very simple form of motor only one arm and one vessel B might be used, and the general operation would then be as follows: Compressed air is admitted to vessel B when at the bottom of the tank. The water is blown out of the vessel through the valve secured to it, and the said vessel, being rendered buoyant by the air, commences to rise in the water. The supply of compressed air is cut off as soon as all the water is driven out of the vessel, and the vessel continues to rise through the water until it reaches the top of the tank, turning the shaft $b$ in its bearings. The air is permitted to escape from the vessel B when it reaches the top of the tank, and the said vessel fills with water through an appropriate valve and sinks back again by gravity to the bottom of the tank. It is obvious that the shaft $b$ is actuated by the ascent and descent of the vessel in the tank, and that the said shaft may be coupled to any mechanism which requires to be driven by a motor. If the vessel B were permitted to descend through the line of ascent, the shaft $b$ would have a rocking motion, and intermediate mechanism would be necessary to convert the rocking motion of the shaft into rotary motion. It is therefore preferable to make the tank of such size that the vessel B may make a complete revolution within it, ascending and descending through opposite semicircular arcs, and causing the shaft $b$ to revolve continuously in one direction, as indicated by the arrow in the drawings.

In order to increase the power of the motor and balance its moving parts, it is preferable to connect a series of equidistant radial arms B' to the hollow shaft $b$ and provide each arm with a vessel B, and it is obvious that more than one series of arms and vessels might be secured to said single central shaft, each additional series revolving in a vertical plane parallel with the first series.

As all the arms and vessels are exactly alike and have similar air-valves and other mechanism attached to them, the description will be confined to one arm only; but two complete arms and vessels are shown in the drawings, to clearly show the action of the air and water valves.

C is an ordinary fly-wheel, secured upon shaft $b$, to equalize the speed of the motor.

D is the valve which admits the air which passes through the hollow arm into the vessel B.

D' is the pipe which supplies the air from the compressor, and $d$ is a stuffing-box secured to shaft $b$ and which revolves upon the end of pipe D and keeps the joint air-tight.

E is the distributing-valve, supported in the distributer-casing E' intermediate between the end of pipe D' and the end of shaft $b$, to which the said casing is secured. A separate valve E is provided for each arm, and $e$ is a small pipe which conveys the air from valve E to the under side of valve D, so that each vessel B has separate means for supplying it with air. The shaft $b$ and the arms B' are preferably made hollow and have the separate air-pipes $e$ placed inside them, as the hollow form gives the arms both strength and lightness, and the air-pipes are protected from injury and offer no frictional resistance to the motion of the machine through the water. If the pipes $e$ were outside the arms and the shaft $b$, the distributer-casing and valves, which must revolve with the shaft $b$ to effect a junction of pipes $e$ with the air-supply pipe, would have to be placed inside the tank. A fixed projection K on one of the bearing-brackets or other fixed support opens each valve E in succession, each said valve being provided with a projecting spindle $e'$, which is pushed inwardly by said projection, the spindles being brought into operative connection with the projection by the rotary motion of the shaft.

F is a hinged valve for letting the air out of vessel B, and G is a valve for admitting water to said vessel. The valve G is hinged to the front of vessel B in the direction of its motion, and the valve F is hinged to the rear of said vessel.

H is a rod, which couples the two valves F and G in one direction by means of the collar $h$, so that the valve G cannot be opened without also opening valve F; but the valve F may be opened independently of valve G.

F' is the pivoted rod for working valve F, and $f$ is the pivoted valve-lever attached to said rod and provided with a roller $f'$.

G' is the pivoted rod for operating the valve G, and $g$ is its pivoted valve-lever provided with the roller $g'$. The levers $f$ and $g$ are preferably pivoted upon opposite sides of arm B' near the central shaft.

I is a stationary cam secured to the tank or other fixed support for the roller $f'$ to engage with, and I' is a similarly-supported stationary cam for operating the roller $g'$.

All the arms and vessels are provided with similar valves and means for opening and closing them, and many other devices—such as tappets—may be used, if desired, for opening said valves at appropriate intervals.

The action of the valves is as follows: Compressed air is admitted to a vessel B at about the time it passes the vertical center line of its shaft at the bottom of the tank, by means of the projection K and valves E and D, as before described, the valve F having previously been opened by means of its rod F' and cam I. The compressed air drives all the water out of said vessel B and renders said vessel buoyant, and any air which escapes through valve F assists the forward motion of the vessel by impact against the water in the tank. The valve G is held closed by cam I' while the air is being admitted and during the ascent of the buoyant vessel B through the water in the tank. When the vessel B arrives at the top of the tank and in the position shown in the drawings, the valve G is opened by means of its rod G' and the cam I'. The water rushes into the vessel through valve G and displaces the air, which escapes through the valve F into the atmosphere, the opening of valve F at this point being secured by the rod H and collar $h$. The valve G is closed by its cam when the vessel reaches the bottom of the tank, so that the same cycle of operations may be again repeated.

I do not confine myself to the use of compressed air for the purpose of operating the motor, as the motor may be worked by carbonic-acid gas or any other fluid which has a lower specific gravity than the water or other liquid in which the revolving parts of the motor are submerged.

What I claim is—

1. In a motor, the combination, with a tank, of a shaft supported in suitable bearings, a hollow closed vessel connected to the shaft upon one side of its center, and separate valves for alternately admitting compressed air or gas and liquid to said vessel, controlling the escape of air therefrom, whereby the vessel is caused to rise and fall through the liquid in the tank and actuate the said shaft.

2. In a motor, the combination, with a tank, of a hollow shaft, a hollow arm secured at one end to said shaft, a hollow closed vessel secured to the free end of the arm, and valves permitting the said vessel to be filled with compressed air or gas through the hollow shaft and arm, whereby the vessel is caused to rise through the liquid in the tank and actuate the said shaft, and separate valves for permitting the air to escape from the said vessel at the top of the tank, substantially as set forth.

3. In a motor, the combination, with a tank, of a shaft projecting through an aperture in the tank below the level of the liquid contained therein, a stuffing-box surrounding said shaft, and a plate of flexible material secured to the tank and to the stuffing-box for supporting the stuffing-box and closing the said aperture in the tank.

4. In a motor, the combination, with a tank, of a revoluble shaft, a series of arms, each secured at one end to said shaft and provided with a hollow closed vessel at its free end, and separate valves permitting each of said vessels in rotation to be filled with compressed air or gas and subsequently to be emptied of air and filled with liquid, whereby the said vessels are caused to rise and fall in the tank and rotate the said shaft.

5. In a motor, the combination, with the tank, of the hollow shaft, the hollow radial arms, the hollow vessels supported by said arms and provided with water-escape valves, small pipes passing through said shaft and arms to the hollow vessels, a supply-pipe for compressed air, and a distributer permitting the air from the supply-pipe to pass down each of the small pipes in succession, substantially as set forth.

6. In a motor, the combination, with the tank, of the hollow shaft, the hollow radial arms, the hollow vessels supported by said arms and provided with water-escape valves, the small pipes provided with valved outlets and passing through said shaft and arms to the hollow vessels, a supply-pipe for compressed air, and valves for distributing the air from the supply-pipe to each of the small pipes in succession, substantially as set forth.

7. In a motor, the combination, with the hollow revoluble shaft and the small supply-pipes passing therethrough, of the distributer-casing secured to the end of said shaft and provided with a stuffing-box, a compressed-air-supply pipe projecting through said stuffing-box, a stationary projection, and spring-actuated valves closing the end of each small pipe and provided with stems projecting through said casing and adapted to be actuated successively by said projections as the casing revolves, substantially as and for the purpose set forth.

8. In a motor, the combination, with the hollow vessel, of the hinged water-inlet valve, the hinged air-outlet valve, and the pivoted rod provided with a collar and connecting the two said valves, whereby the air-valve is opened simultaneously with the opening of the water-valve.

9. In a motor, the combination, with the hollow gyrating vessels, of the water-inlet and air-outlet valves hinged to said vessels, one or more stationary operating devices, such as cams, and intermediate rod-and-lever mechanism connecting said operating devices with the said valves, whereby the valves may be opened and closed at appropriate intervals, substantially as set forth.

10. In a motor, the combination, with a hollow gyrating vessel, of a water-inlet valve secured to the front end of the valve in the direction of its motion, an air-escape valve at the rear of said vessel, a rod coupling said valves together, intermediate rod-and-lever mechanism connected to the water-valve, and a stationary device, such as a cam, for operating said intermediate mechanism and opening the valves, substantially as and for the purpose set forth.

In testimony whereof I affix my signature in presence of two witnesses.

WILLIAM SCANTLEBURY.

Witnesses:
HERBERT W. T. JENNER,
F. McC. CRISWELL.